United States Patent [19]

Freeman et al.

[11] Patent Number: 4,929,950
[45] Date of Patent: May 29, 1990

[54] SYNTHETIC APERTURE RADAR SYSTEMS

[75] Inventors: Anthony Freeman, La Crescenta, Calif.; David Blacknell; Shaun Quegan, both of Sheffield, England; Ian A. Ward, Chelmsford, England; Christopher J. Oliver, Malvern, England; Ian P. Finley, St. Johns, England; Richard G. White, Malvern, England; James W. Wood, Malvern Link, England

[73] Assignees: The General Electric Company, plc; The Secretary of State for Defence in Her Britannic Majesty's Government of the United Kingdom of Great Britain and Northern Ireland, both of London, United Kingdom

[21] Appl. No.: 293,599

[22] Filed: Jan. 5, 1989

Related U.S. Application Data

[63] Continuation of Ser. No. 79,966, Jul. 31, 1987, abandoned.

[30] Foreign Application Priority Data

Dec. 18, 1986 [GB] United Kingdom ............... 8630315

[51] Int. Cl.⁵ .............................................. G01S 13/90
[52] U.S. Cl. ..................................................... 342/25
[58] Field of Search .......................................... 342/25

[56] References Cited

U.S. PATENT DOCUMENTS

| | | | |
|---|---|---|---|
| 4,134,113 | 1/1979 | Powell | 342/25 |
| 4,163,231 | 7/1979 | Zuerndorfer et al. | 342/25 |
| 4,219,811 | 8/1980 | Herman et al. | 342/25 |
| 4,246,580 | 1/1981 | Caputi, Jr. | 342/25 |
| 4,325,065 | 4/1982 | Caputi, Jr. | 342/25 |
| 4,471,357 | 9/1984 | Wu et al. | 342/25 |
| 4,562,439 | 12/1985 | Peralta et al. | 342/25 X |
| 4,563,686 | 1/1986 | Boles | 342/25 |
| 4,594,593 | 6/1986 | Nohmi | 342/25 |
| 4,602,257 | 7/1986 | Grisham | 342/25 |
| 4,617,567 | 10/1986 | Chan | 342/25 |
| 4,706,088 | 11/1987 | Weindling | 342/25 |
| 4,706,089 | 11/1987 | Weindling | 342/25 |
| 4,723,124 | 2/1988 | Boles | 342/25 |
| 4,724,418 | 2/1988 | Weindling | 342/25 |

OTHER PUBLICATIONS

Blacknell et al, "Motion Compensation and Geometric Distortion in Airborne SAR Imagery", Progress in Imaging Sensors, Proc. ISPRS Symposium, Stuttgart, Sep. 1–5, 1986 (ESA SP-252, Nov. 1986), pp. 539–548.

*Primary Examiner*—Thomas H. Tarcza
*Assistant Examiner*—John B. Sotomayor
*Attorney, Agent, or Firm*—Spencer & Frank

[57] ABSTRACT

In a synthetic aperture radar system, information concerning the radar reflectivity of a point on the ground is placed in an image at an azimuthal (cross-range) position which corresponds to the position of zero Doppler frequency shift of the received signal, under the assumption that the antenna has followed a straight line trajectory. In practice, the antenna trajectory will undergo small deviations about this straight line path which are not taken into account in the azimuth processing and which, consequently, cause incorrect azimuthal positioning in the image of the information concerning a point target on the ground.

The invention uses the value of the slope of the frequency modulation of the received signal, calculated by means of an autofocus procedure, to determine the intercept of this frequency modulation at successive azimuth positions. This true intercept value is then incorporated in the azimuth processing, instead of the assumed intercept of the frequency modulation, allowing imagery which is free from azimuthal positioning errors to be produced.

3 Claims, 4 Drawing Sheets

SYNTHETIC APERTURE RADAR SYSTEMS

This application is a continuation, of application Ser. No. 07/079,966, filed July 31st, 1987 now abandoned.

FIELD OF THE INVENTION

This invention relates to an airborne synthetic aperture radar (SAR) system. An SAR system is an airborne imaging radar which obtains range information by observing the time delay incurred by an electromagnetic signal received after reflection from an object, and which obtains azimuth (cross-range) information by observing the Doppler frequency shift of the received signal, there being relative motion between the object and the antenna of the radar system.

DESCRIPTION OF THE PRIOR ART

The antenna is mounted on an aircraft which is flown along a straight line trajectory thereby providing the relative motion between the antenna and the ground necessary to produce the Doppler frequency shift used in the azimuth processing. As a result of the straight line antenna trajectory, the range and azimuth directions form a two-dimensional Cartesian coordinate system. Information (specifically a measure of the radar reflectivity) about points on the ground can then be plotted in an image which has a corresponding coordinate system.

A description of a conventional synthetic aperture radar system can be found in "Introduction to Radar Systems" by M.I. Skilink, 2nd edition published by McGraw-Hill in 1980, at pages 517 to 529.

When the antenna is at a particular azimuth position, all points on the ground at the same azimuth position lie on a line which is perpendicular to the antenna trajectory. As a result, signals received from these points have no Doppler frequency shift since there is, instantaneously, no relative motion between these points on the ground and the antenna. This fact is used when information about a point on the ground is positioned in azimuth in the image, i.e. the azimuth position is determined by observing the position at which the signal received from the point on the ground has no Doppler frequency shift. This process is illustrated in FIG. 1.

An aircraft mounting a synthetic aperture radar antenna 1 travels along a straight line path 2 while transmitting signals to and receiving signals from a strip of terrain 3. The received signals are the processed to produce an image 4 corresponding to the strip of terrain 3.

When the antenna 1 is in position 1A it receives signals without Doppler shift from a segment 5A of the terrain strip 3, this segment 5A is plotted at the corresponding position 6A in the image 4. Similarly when the antenna is in a position 1B it receives signals without Doppler shift from a segment 5B and of the strip 3 and plots it at position 6B in the image 4.

In this way an image of the whole of the strip 3 is built up as the antenna travels along the path 2.

In practice, although it is attempted to maintain the antenna travelling along a straight line path, small deviations from this ideal trajectory will inevitably occur which are not taken into account when performing the azimuth processing.

Thus, when the antenna is at a particular azimuth position, points on the ground which lie on the line perpendicular to the antenna trajectory at this position will still be assigned the same azimuth position in the image. This situation is shown in FIG. 2 where the deviations have been exaggerated for the purpose of illustration. It can be seen that the variations of the antenna trajectory 7 and the straight line path 2 cause the information about points on the ground to be incorrectly positioned in the image.

When the antenna 1 is in position 1C it receives signals without Doppler shift from a section 5C of terrain strip 3, however the processing system believes that the antenna 1 is at a position 1D and that the section 5C is in fact section 5D and accordingly plots it at position 6D in the image 4. Similarly when the antenna is at position 1E and receives signals without Doppler shift from a section 5E of terrain strip 3, the processing system believes that the antenna 1 is at a position 1F and that it is observing a section 5F of the terrain strip 3, accordingly this is plotted at position 5F in the image 4.

It can clearly be seen that as a result of this misplotting of sections 5C and 5E in the image 4 the image of the section of terrain between sections 5C and 5E is compressed in the direction of motion of the aircraft.

Although it may be though that both range and azimuth positioning errors can be significant, in practice the range errors are negligible in comparison to the azimuth errors, which can be observed as compressions and rarefactions of the image in the azimuth direction as compared with a map of the imaged region.

BRIEF SUMMARY OF THE INVENTION

This invention provides a synthetic aperture radar system in which radar signals are transmitted into a region containing a number of objects of interest from a moving antenna, and reflected from the objects and then received at the antenna; and these received signals are used to calculate the relative positions of these objects, any distortion of these calculated relative positions caused by the antenna's trajectory being calculated from the rate of change of the frequency modulation of the return signals.

BRIEF DESCRIPTION OF THE DRAWINGS

The invention will now be described with reference to the accompanying drawings in which.

DETAILED DESCRIPTION OF THE INVENTION

Azimuth processing of the received signal relies on knowing the frequency shifts produced in signals reflected from a single point target on the ground by Doppler shift as the antenna moved past that point. Since nothing is known about the deviations of the antenna trajectory it must be assumed that the antenna has, indeed, followed a straight line path. This would give rise to a linear frequency modulation of the signals received from a single point target, and this will be termed the 'assumed frequency modulation'. In fact, the deviations of the antenna trajectory from a straight line path will give rise to a different frequency modulation which will be termed the 'true frequency modulation'.

The true frequency modulation will, in general, be non-linear. However, it is convenient to assume that a linear approximation can be made and from this point be the discussion onwards the 'true frequency modulation' will refer to this linear approximation.

This approximation is thus in the form of a linear equation and where x is the difference in the azimuthal position of the SAR antenna and the target, A is the intercept, a first constant. B is the slope, a second constant and the frequency modulation is F.

$$F = A + Bx$$

Figure 1:
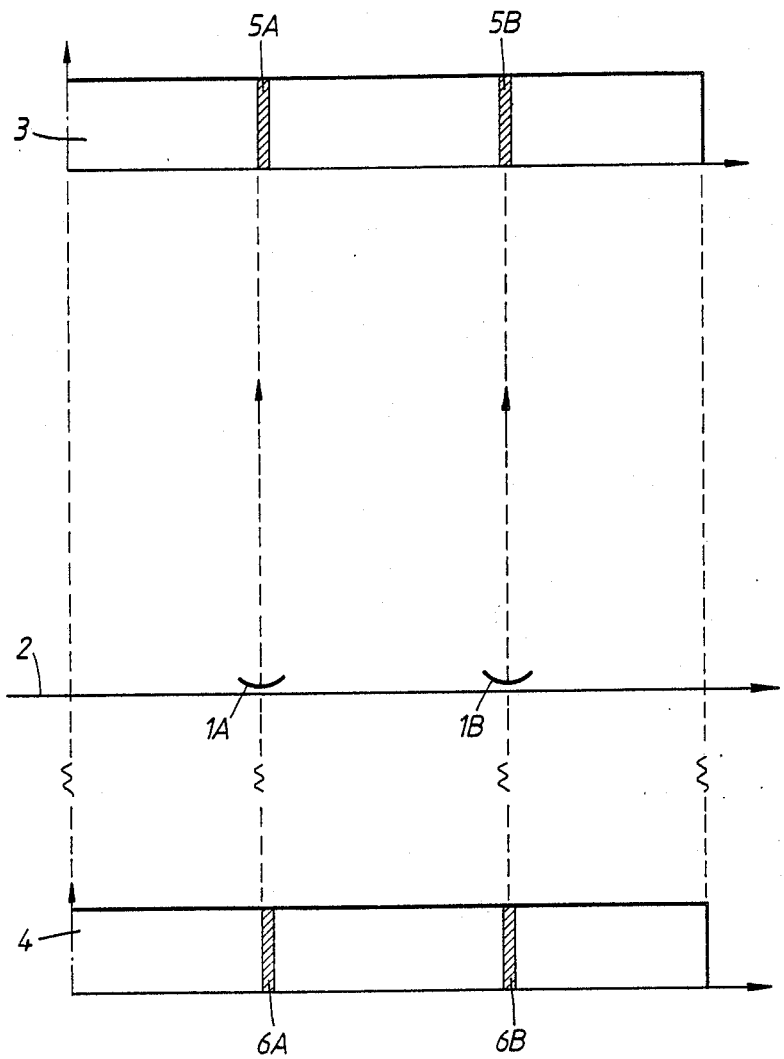
FIG. 1 shows the operation of an ideal synthetic aperture radar system, in schematic form.
Figure 2:
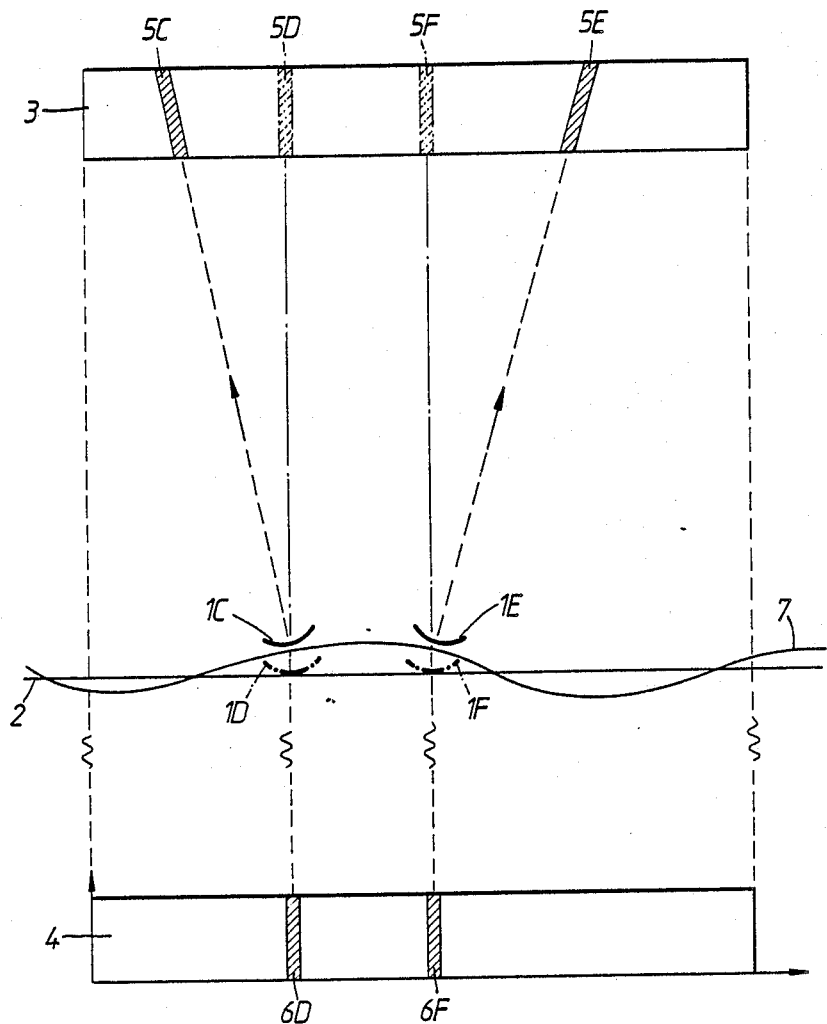
FIG. 2 shows the operation of a real synthetic aperture radar system in schematic form.

The difference between the intercepts of the assumed and true frequency modulations is responsible for the incorrect azimuthal positioning shown to occur by geometric considerations in the descriptions of FIGS. 1 and 2. If the intercept of the true frequency modulation could be determined then it could be used instead of the assumed intercept of the assumed frequency modulation in the azimuth processing and no azimuthal positioning errors would occur. The intercept of the true frequency modulation can be determined if the true slope is known and thus, to produce imagery which is free from azimuthal positioning errors, it is sufficient to find the slope of the true frequency modulation.

The difference between the slopes of the assumed and true frequency modulations is responsible for a loss of focus in the image. The degree to which an image is in focus can be characterised by the contrast of the image (where contrast is defined as the ratio of standard deviation to mean). Thus a numerical search can be made through different values of the assumed slope, performing the azimuth processing for each value of the slope, until the image which has the maximum contrast, and which is therefore correctly focused, is found. This procedure is termed 'autofocus'. The slope which produces the focus image will be equal to the slope of the true frequency modulation and values of this true slope for successive azimuth positions can be determined by repeating the autofocus process on successive azimuth strips. The statistical nature of the contrast measure means that only average values of the true slop over a number of azimuth positions can be determined. However, the value of the true slop can be updated sufficiently often for the purposes of the invention, since the movements of any real aircraft will be relatively slow compared to the pulse rate of an SAR system.

It is thus possible, by means of autofocus, to find the slope of the true frequency modulation and from this calculate the intercept of the true frequency modulation, thereby providing the information required to produce imagery which is free from azimuthal positioning errors.

From the foregoing qualitative description it is not immediately clear how the intercept and the slope of the true frequency modulation are related. In order to consider this, it is necessary to treat the matter mathematically.

Figure 3:
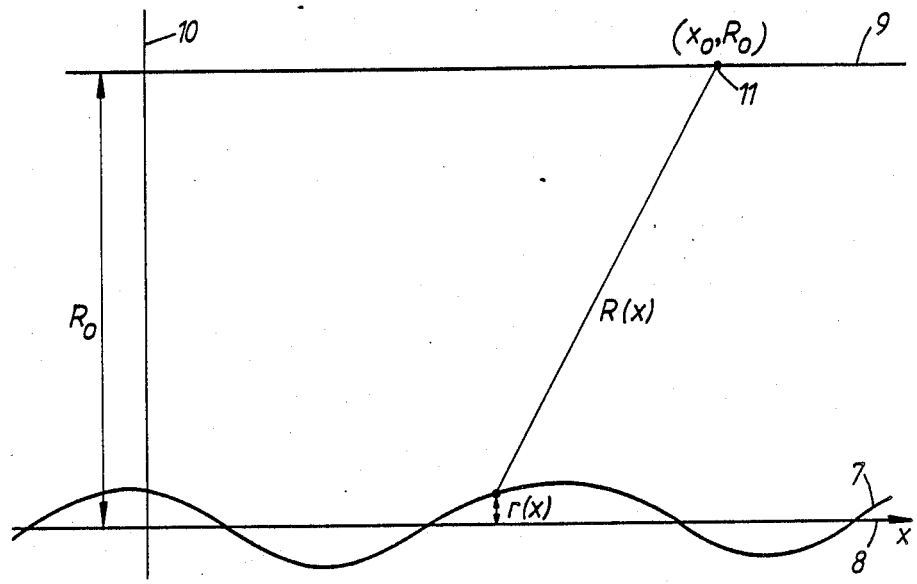
FIG. 3 is an explanatory diagram.

Referring to FIG. 3 consider the antenna following a trajectory 7 which deviates slightly from a straight line path 8 whilst imaging a line on the ground 9 which runs parallel to this straight line path 8. A plane 10 which passes through the straight line path and the imaged line is called the 'slant range' plane. To first order approximations, the significant deviations of the antenna trajectory 7 from the straight line path 8 occur in the slant range plane 10 and so the two-dimensional imaging geometry shown in FIG. 3 is produced. In this, the straight line path 8 about which the antenna trajectory 7 deviates is given by the x axis, the antenna trajectory 7 is given by $(x, r(x))$ and the range from the straight line path 8 to the imaged line on the ground 9 is $R_o$. A specific point target 11 positioned at $(x_o, R_o)$ is considered which is at range $R(x)$ from the antenna.

The phase of the signal received from this point target is given by, $$\phi(x) = 2\pi \frac{2R(x)}{\lambda} \qquad (1)$$

where $\lambda \equiv$ wavelength of electromagnetic signal Now, by Pythagoras' theroem, $$R^2(x) = (R_o - r(x))^2 = (x_o - x)^2 \qquad (2)$$

$$= R_o^2 \left[ \frac{(x_o - x)^2}{R_o^2} - \frac{2r(x)}{R_o} + \frac{r^2(x)}{R_o^2} + 1 \right]$$

The deviations from the straight line path can be assumed to be small in comparison to the range of the target, thus $$r(x) << R_o,$$

The relationship between spatial frequency, $f(x)$, and phase is given by, $$2\pi f(x) = \frac{d\phi(x)}{dx}$$

Therefore, $$f(x) = \frac{2}{\lambda} \frac{dR(x)}{dx} = \frac{2[(x - x_o) - R_o r'(x)]}{\lambda R(x)} \qquad (4)$$

where a dash represents a spatial derivative.

A linear approximation to this frequency modulation can be obtained by taking the first two terms of the Taylor expansion of $f(x)$ about the point $x = x_o$. This gives, $$f(x) = f_o(x_o) + f_1(x_o) x$$
(5)

where $f_o(x_o)$ is the intercept, with $f_o(x_o) = f(x_o)$ and $f_1(x_o)$ is the slope, with $f_1(x_o) - f'(x_o)$ Now, $$f'(x) = \frac{2(1 - R_o r''(x))}{\lambda R(x)} - \frac{2((x - x_o) - R_o r'(x))^2}{\lambda R^3(x)} \qquad (6)$$

$$\approx \frac{2(1 - R_o r''(x))}{\lambda R(x)}$$

Noting that $$R(x_o) = R_o - r(x_o)$$
$$\approx R_o \text{ since } r(x) << R_o,$$

and using equations (4), (5) and (6), $$f_o = -\frac{2r'(x_o)}{\lambda}, \qquad (7)$$

-continued $$f_1 = \frac{2(1 - R_o r''(x_o))}{R_o}$$

Thus the relationship between the intercept and the slope of the true frequency modulation is $$f_o(x_o) = \int_0^{x_o} \left[ f_1(x) - \frac{2}{\lambda R_o} \right] dx' - \frac{2r'(o)}{R_o}, \quad (8)$$

where the spatial dependence of $f_o$ and $f_1$ has been written explicitly.

The final term on the right-hand side of equation (8) is an unknown constant. However, since only variations of $f_o$ with azimuthal position are important this constant can be taken to be zero, giving finally, $$f_o(x_o) = \int_0^{x_o} \left[ f_1(x') - \frac{2}{\lambda R_o} \right] dx'. \quad (9)$$

Equation (9) is the relationship which allows the intercept of the true frequency modulation to be determined from the slope of the true frequency modulation.

Figure 4:
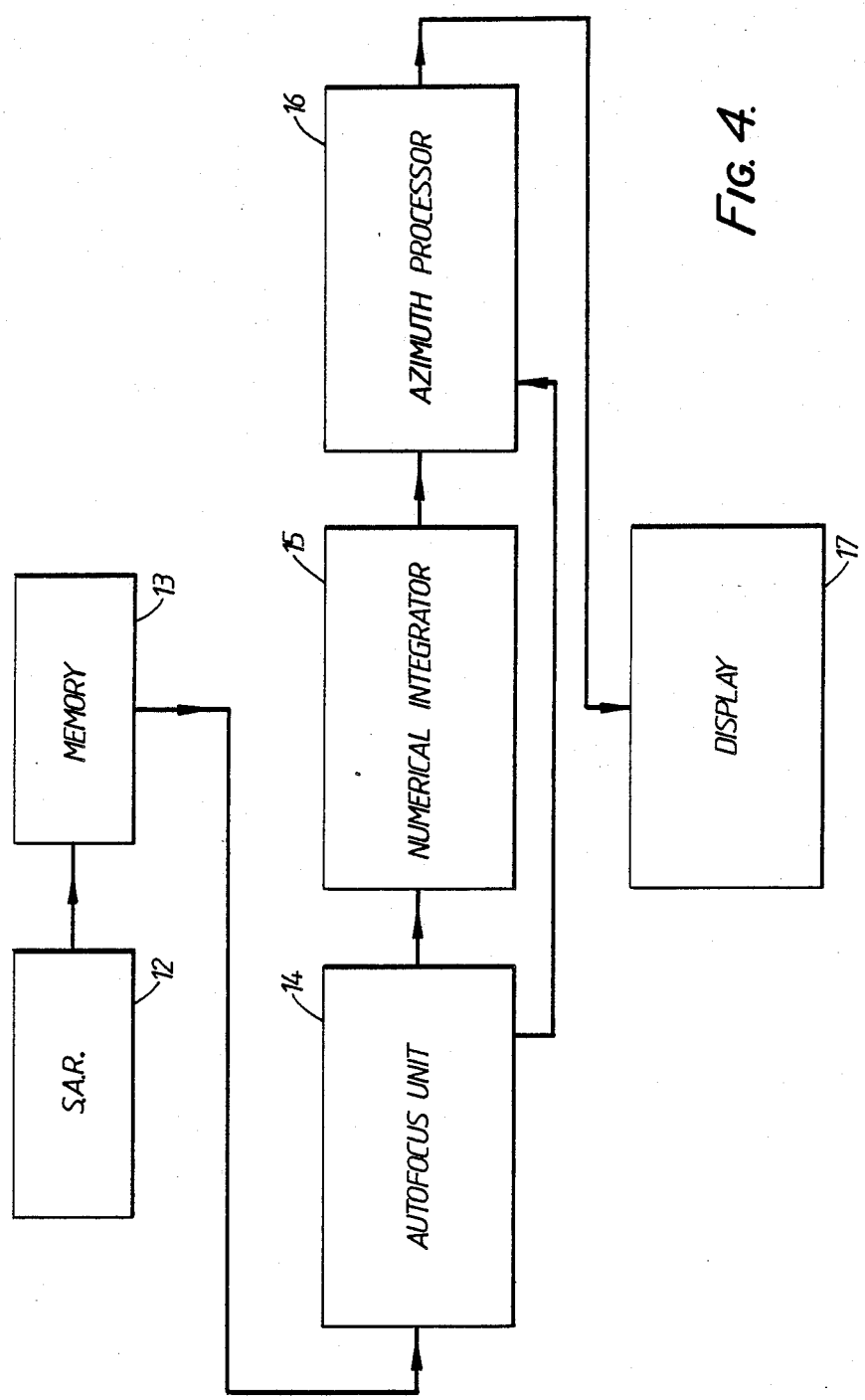
FIG. 4 is a block diagram showing the method of operation of an improved synthetic aperture radar system.

Referring to FIG. 4, a standard SAR system 12 provides data which is digitally recorded in a memory 13 as raw data. The first step is to determine the slope of the true frequency modulation at equally spaced intervals in azimuth. This is carried out by an autofocus unit 14. At this stage the intercept of the assumed frequency modulation is used in the azimuth processing. The values of the true slope provided by the autofocus unit 14 are supplied to a numerical integrator 15 which evaluates equation (9) above to find the intercept of the true frequency modulation at the equally spaced intervals in azimuth. Azimuth processing is then performed by an azimuth processor 16 using the true intercept of the true frequency modulator provided by the numerical integrator 15 and the true slope of the true frequency modulation provided by the autofocus unit 14 thus producing a final image which is free from azimuthal positioning errors and which is shown on a display 17.

It is believed that this invention will prove to be of considerable value in airborne synthetic aperture radar systems. In such systems the production of geometrically accurate imagery is a necessary requirement if useful positional information is to be obtained.

It will be appreciated that the particular form of the invention which has been described is only an example of one way in which the invention can be carried out. Modifications are possible. For example, the autofocus procedure may use some method such as multi-look registration rather than contrast optimization to find the optimally focussed image.

The memory 13, autofocus unit 14, numerical integrator 15 and azimuth processor 16 are functionally separate and perform different data-processing operations but in fact all of them are contained in a single electronic computer.

It is also pointed out that, although the invention has been described with specific reference to airborne synthetic aperture radar systems, it is equally applicable to spaceborne synthetic aperture radar systems which are subject to the same azimuthal positioning errors. However, the trajectories of spaceborne SARs are usually known to a greater degree of precision than those of airborne SARs so the problem does not occur to the same degree.

We claim:

1. In a synthetic aperture radar system having a moving antenna for transmitting radar signals into a region containing a number of objects of interest and receiving a reflected signal from each of said number of objects, and an azimuth processor means for azimuth processing said received reflected signals to calculate relative positions of said number of objects; the improvement comprising means for determining distortions, caused by deviations of the moving antenna from a straight line trajectory, in each of said reflected signals and for supplying signals for correcting said distortions to said azimuth processing means, said distortion determining means including:

an autofocus unit for determining the slope of a linear approximation of the frequency modulation of the received signals with respect to position, and for providing a first output signal corresponding to said slope, an integrator means, to whose input is fed a said first output signal of said autofocus unit, for integrating said first output signal to determine the intercept of the linear approximation of the frequency modulation of the received signals, and for providing a second output signal corresponding to said intercept; and means for supplying said first and second output signals to said azimuth processor means whereby the azimuth processing is carried out in said azimuth process or means using the thus determined slope and intercept of the linear approximation of the frequency modulation of the received signals.

2. A synthetic aperture radar system as defined in claim 1 wherein said autofocus unit determines said slop at equally spaced intervals in azimuth.

3. A synthetic aperture radar system as defined in claim 2 wherein said azimuth processor means performs said azimuth processing for zero Doppler frequency shift.

* * * * *